(12) United States Patent
Struck et al.

(10) Patent No.: US 7,576,162 B2
(45) Date of Patent: Aug. 18, 2009

(54) CHEMICAL PROCESS

(75) Inventors: Oliver Struck, Düren (DE); Andreas Pingel-Keuth, Düren (DE); Christian Przybyla, Duisburg (DE); Ulrich Fehrenbacher, Karlsruhe (DE); Thomas Hirth, Bühl (DE); Steffen Unser, Rheinstetten (DE)

(73) Assignees: Akzo Nobel N.V., Arnhem (NL); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 596 days.

(21) Appl. No.: 11/471,881

(22) Filed: Jun. 21, 2006

(65) Prior Publication Data

US 2007/0004901 A1 Jan. 4, 2007

Related U.S. Application Data

(60) Provisional application No. 60/695,668, filed on Jun. 30, 2005.

(51) Int. Cl.
*C08L 77/00* (2006.01)
*C08G 73/02* (2006.01)
*C08F 6/00* (2006.01)

(52) U.S. Cl. .................. 525/408; 210/634; 210/639; 525/420; 525/430

(58) Field of Classification Search ............... 525/408, 525/420, 430; 210/634, 639
See application file for complete search history.

(56) References Cited

U.S. PATENT DOCUMENTS

| 2,926,154 | A | 2/1960 | Keim | 260/29.2 |
|---|---|---|---|---|
| 3,311,594 | A | 3/1967 | Earle, Jr. | 260/77.5 |
| 3,891,589 | A | 6/1975 | Ray-Chaudhuri | 260/29.2 |
| 4,336,835 | A | 6/1982 | Takagishi et al. | 162/164.3 |
| 4,450,045 | A | 5/1984 | Hertel et al. | 162/164.3 |
| 4,857,586 | A | 8/1989 | Bachem et al. | 524/845 |
| 4,975,499 | A | 12/1990 | Bachem et al. | 525/430 |
| 5,017,642 | A | 5/1991 | Hasegawa et al. | 524/608 |
| 5,019,606 | A | 5/1991 | Marten et al. | 523/414 |
| 5,034,132 | A | 7/1991 | Miyakawa et al. | 210/634 |
| 5,093,470 | A | 3/1992 | Bachem et al. | 528/407 |
| 5,516,885 | A | 5/1996 | Gorzynski et al. | 528/482 |
| 5,643,430 | A | 7/1997 | Gorzynski | 204/523 |
| 6,180,755 | B1 | 1/2001 | Brimmer et al. | 528/483 |
| 6,576,687 | B1 | 6/2003 | Gassen et al. | 523/404 |
| 2005/0037932 | A1 | 2/2005 | Liu et al. | 508/458 |

FOREIGN PATENT DOCUMENTS

| CN | 1350795 A | 5/2002 |
|---|---|---|
| EP | 0 374 879 B1 | 6/1990 |
| WO | WO 99/33901 A1 | 7/1999 |
| WO | WO 00/34358 A1 | 6/2000 |
| WO | WO 01/18093 A1 | 3/2001 |
| WO | WO 02/50163 A2 | 6/2002 |

OTHER PUBLICATIONS

English language abstract abstracting CN 1350795A, May 29, 2002.

*Primary Examiner*—Ana L Woodward
(74) *Attorney, Agent, or Firm*—Robert C. Morriss

(57) ABSTRACT

The invention relates to a process for the production of a nitrogen containing epihalohydrin polymer involving reaction of a nitrogen-containing precursor selected from the group consisting of amines, poly-amines, polyaminoamides, polyurethanes and mixtures thereof with epihalohydrin to form a solution of said epihalohydrin polymer, the process comprising a purification step to remove organic impurities from the formed solution of the epihalohydrin polymer, said purification step comprising contacting the solution of the epihalohydrin polymer with a fluid under liquid, supercritical or near supercritical conditions to effect extraction of organic impurities from the solution of the epihalohydrin polymer to the fluid, withdrawing fluid enriched in organic impurities from the solution of the epihalohydrin polymer, and separating extracted impurities from the withdrawn fluid, wherein the fluid comprises a substance that at atmospheric pressure and room temperature (about 25° C.) is gaseous. The invention also relates to a process for purifying a solution of a nitrogen containing epihalohydrin polymer.

18 Claims, 1 Drawing Sheet

CHEMICAL PROCESS

Figure 1:
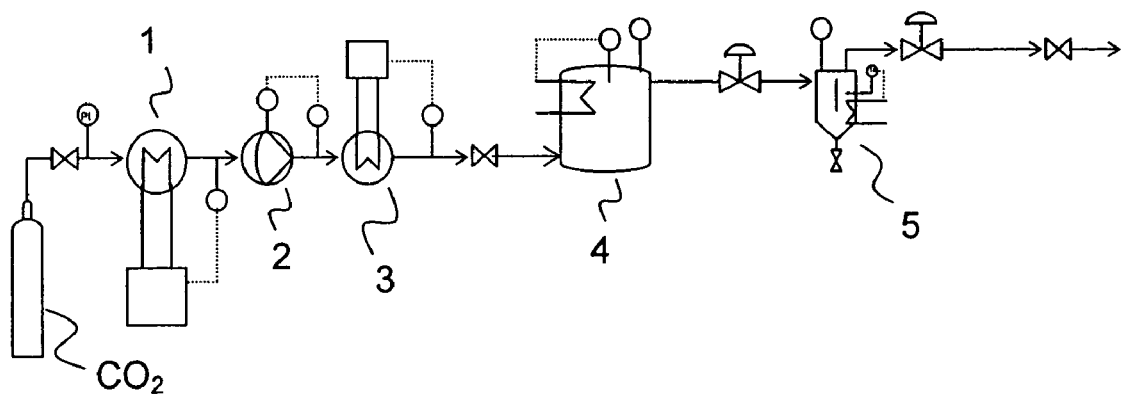

The present application claims priority of U.S. Provisional Patent Application Ser. No. 60/695,668, filed on Jun. 30, 2005.

The present invention relates to a process for the production of an nitrogen containing epihalohydrin polymer from a nitrogen-containing precursor comprising a purification step to remove organic impurities, particularly reaction products of epihalohydrin. The invention further relates to a process for purifying a solution of a nitrogen containing epihalohydrin polymer made from nitrogen-containing precursor from organic impurities.

At preparation of epihalohydrin polymers from nitrogen-containing precursors organic by-products may be obtained, some of which frequently are halogenated. Further, unreacted epihalohydrin may also remain in the final product. A typical example is the preparation of polyaminoamide epichlorohydrin polymers that are useful as wet strength resins in paper making. However, many halogenated organic compounds are toxic and/or questionable from an environmental point of view and for many applications, such as paper making, it is desirable to decrease the content thereof.

Various purifications methods for removing chlorinated contaminants from polyaminoamide epihalohydrin polymers have been disclosed, for example ion exchange in U.S. Pat. No. 5,516,885, electrodialysis in U.S. Pat. No. 5,643,430, ultra-filtration in WO 00/34358, treatment with activated carbon in WO 01/18093, treatment with a base in WO 99/33901 and enzymatic action in WO 02/50163. U.S. Pat. No. 6,576,687 discloses a method of producing polycondensate solutions based on polyamide amine epichlorohydrin resins claimed to have a very low content of organic chlorine compounds. However, these preparation and purification methods are either complicated to operate or insufficiently effective.

It has been disclosed to remove impurities or residual monomers from polymers by extracting with carbon dioxide, see e.g. U.S. Pat. No. 5,034,132 and U.S. Pat. No. 6,180,755. It has also been disclosed to extract impurities with carbon dioxide from polymer dispersions, as described in EP 374879.

CN 1350795 discloses removal of DCP and MCP from a hydrolytic liquid of plant protein by treating with liquefied or supercritical carbon dioxide.

US 2005/0037932 discloses a perfluoropolyether lubricant, the preparation of which includes a supercritical fluid extraction purification step.

It is an object of the invention to provide a process for the production of a nitrogen containing epihalohydrin polymer from a nitrogen-containing precursor comprising an effective purification step for removing organic impurities, particularly halogen containing impurities.

It is another object of the invention to provide a process for efficiently removing organic impurities, particularly halogen containing impurities, from a solution of a nitrogen containing epihalohydrin polymer made from a nitrogen-containing precursor.

It is still another object of the invention to provide for efficient removal of epihalohydrin or reaction products thereof from a solution of a nitrogen containing epihalohydrin polymer without significantly negatively affecting its desired properties.

It is a further object of the invention to provide for efficient removal of 1,2-, or 1,3-dihalo-2-propanol or 3-halo-1,2-propanediol from a polyaminoamide epihalohydrin polymer without significantly negatively affecting its desired properties.

Through the present invention it has been found possible to achieve these objects.

One aspect of the invention concerns a process for the production of a nitrogen containing epihalohydrin polymer involving reaction of a nitrogen-containing precursor selected from the group consisting of amines, poly-amines, polyaminoamides, polyurethanes and mixtures thereof with epihalohydrin to form of a solution of said epihalohydrin polymer, the process comprising a purification step to remove organic impurities from the formed solution of the epihalohydrin polymer, said purification step comprising contacting the solution of the epihalohydrin polymer with a fluid under liquid, supercritical or near supercritical conditions to effect extraction of organic impurities from the solution of the epihalohydrin polymer to the fluid, withdrawing fluid enriched in organic impurities from the solution of the epihalohydrin polymer, and separating extracted impurities from the withdrawn fluid, wherein the fluid comprises a substance that at atmospheric pressure and room temperature (about 25° C.) is gaseous.

Another aspect of the invention concerns a process for purifying a solution of a nitrogen containing epihalohydrin polymer formed by reaction of a nitrogen-containing precursor selected from the group consisting of amines, poly-amines, polyaminoamides, polyurethanes and mixtures thereof with epihalohydrin comprising the steps of contacting the solution of the epihalohydrin polymer with a fluid under liquid, supercritical or near supercritical conditions to effect extraction of organic impurities from the solution of the epihalohydrin polymer to the fluid, withdrawing fluid enriched in organic impurities from the solution of the epihalohydrin polymer, and separating extracted impurities from the withdrawn fluid, wherein the fluid comprises a substance that at atmospheric pressure and room temperature (about 25° C.) is gaseous.

Extracting with a fluid under supercritical or near supercritical conditions has been found to efficiently remove unwanted organic compounds, particularly halogen containing compounds, from the polymer in a comparatively simple procedure without significantly negatively affecting its desired properties, for example as additive in paper making and particularly as wet strength resin. Normally such fluid may also be re-used after separation of the extracted impurities. Preferred fluids are those that have a critical temperature ($T_{cr}$) from about 20° C. to about 100° C., most preferably from about 30° C. to about 60° C., and a critical pressure ($P_{cr}$) from about 30 bar to about 500 bar, most preferably from about 70 bar to about 300 bar. Examples of fluids include carbon dioxide, nitrous oxide, ethane, ethane and propane. Carbon dioxide is particularly preferred as it is readily available, non-toxic and non-flammable. Further, carbon dioxide has been found not to give any negative impact to the treated polymer. The fluid may by used in substantially pure form or mixed with small amounts of one or more co-solvents, surfactants, complexing agents or the like.

Nitrogen containing epihalohydrin polymers in the process of the present invention include those that have been prepared with epihalohydrin, e.g. epichlorohydrin, as a reactant, either during the polymerisation or in the modification of an existing polymer. The invention is particularly advantageous for nitrogen containing epihalohydrin polymers that are water soluble.

Nitrogen containing epihalohydrin polymers include those formed by reactions of nitrogen containing precursors selected from amines, poly-amines, polyaminoamides, polyurethanes and mixtures thereof. Most preferably, the polymers are polyaminoamide-epihalohydrin polymers, which also may be referred to as polyamidoamine-epihalohydrin polymers, and are useful as wet strength resins in paper making. Epihalohydrins that can be used include epibromohydrin and epichlorohydrin, preferably epichlorohydrin. Suitably, the polymers are produced using from about 0.5 to about 2 moles of epihalohydrin per mole of basic nitrogen in the nitrogen-containing precursor.

The nitrogen-containing precursor is preferably the polyaminoamide reaction product of a polycarboxylic acid or a derivative thereof, suitably a dicarboxylic acid or derivative thereof, and a polyamine. Derivatives of carboxylic acids include e.g. anhydrides, esters and half esters. Suitable polycarboxylic acids include saturated or unsaturated aliphatic or aromatic dicarboxylic acids. Preferably, the polycarboxylic acids contains less than 10 carbon atoms.

Preferred polycarboxylic acids include oxalic acid, malonic acid, succinic acid, glutaric acid, adipic acid, azelaic acid, sebacic acid and derivatives and mixtures thereof, of which adipic acid is particularly preferred.

Preferred polyamines include polyalkylene polyamines, or mixtures thereof, having the following formula:

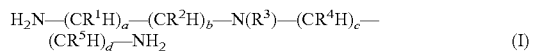

$$H_2N-(CR^1H)_a-(CR^2H)_b-N(R^3)-(CR^4H)_c-(CR^5H)_d-NH_2 \quad (I)$$

in which $R^1$-$R^5$ represent hydrogen or lower alkyl, preferably up to $C_3$ and a-d represent integers of from 0 to 4. Preferred polyalkylene polyamines include diethylene triamine, tri-ethylene tetra amine, tetraethylene penta amine, dipropylene triamine, and mixtures thereof.

The polyamines of formula (I) can be combined with other polyamines or mixtures of other amines. Preferably, these amines have any of the following formulae II-VII:

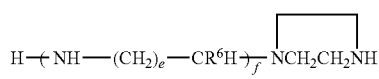

(II)

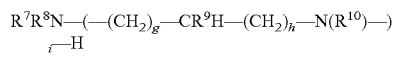

(III)

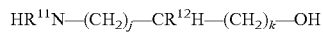

(IV)

(V)

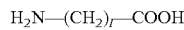

(VI)

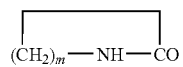

(VII)

in which $R^6$-$R^{14}$ represent hydrogen or lower alkyl, preferably up to $C_3$, e-l represent integers of from 0 to 4, and m represents an integer of from 0 to 5.

The polycarboxylic acid and the polyamine may, for example, be applied in a molar ratio from about 1:0.5 to about 1:1.5.

The nitrogen-containing epihalohydrin-based polymer is preferably present in an aqueous solution, that further may comprise a water-miscible solvent such as methanol, ethanol or dimethyl formamide. The aqueous polymer solution is preferably prepared from an aqueous solution of a nitrogen-containing precursor. The molecular weights of the polymers are not critical and may, for example, be within the range of from about 50000 to about 1000000 or higher.

Preparation of epihalohydrin polymers can be performed by any known process, such as those disclosed in any one of U.S. Pat. No. 4,450,045, U.S. Pat. No. 3,311,594, U.S. Pat. No. 4,336,835, U.S. Pat. No. 3,891,589, U.S. Pat. No. 2,926,154, U.S. Pat. No. 4,857,586, U.S. Pat. No. 4,975,499, U.S. Pat. No. 5,017,642, U.S. Pat. No. 5,019,606 U.S. Pat. No. 5,093,470 and U.S. Pat. No. 5,516,885, but additionally including a purification step comprising extraction with a fluid under supercritical or near supercritical conditions as described herein. According to the invention it is also possible to subject commercially or otherwise readily available nitrogen containing epihalohydrin polymers to such a purification step.

The solution of the epihalohydrin polymer is preferably an aqueous solution and it has been found that only small amount of water are withdrawn in the purification step.

The solids content of the solution to be purified is preferably as high as possible without causing handling problems and can in many cases be as high as about 35 wt % or more, but is preferably from about 5 to about 30 wt %, most preferably from about 10 to about 25 wt %. The viscosity of the solution is preferably from about 1 to about 250 mPas, most preferably from about 5 to about 200 mPas. For example, the viscosity may be from about 1 to about 100 mPas or from about 5 to about 60 mPas.

The invention is particularly advantageous for removing halogen containing organic impurities. Halogen containing impurities that can be removed include epihalohydrin as such, particularly epichlorohydrin, and reactions products thereof such as 1,2- and 1,3-dihalo-2-propanol (DXP) and 3-halo-1,2-propanediol (XPD), particularly 1,2- and 1,3-dichloro-2-propanol (DCP) and 3-chloro-1,2-propanediol (CPD). By the purification according to the present invention, DXP and XPD as well as any remaining epihalohydrin can be removed and eventually destructed. For example, it is possible to obtain polyaminoamide epichlorohydrin polymers with a content of organic chlorines below about 0.01 wt % and even below about 0.0001 wt % or less.

The extraction takes place under conditions in which the fluid is in a liquid, supercritical or near supercritical state. Near supercritical means that the temperature is slightly below $T_{cr}$ and/or the pressure is slightly below $P_{cr}$, but the properties of the fluid are substantially equivalent to the case when the temperature and the pressure exceeds $T_{cr}$ and $P_{cr}$ respectively. The temperature in K is preferably at least about $0.9 \times T_{cr}$, most preferably at least $0.95 \times T_{cr}$. The pressure is preferably at least about $0.9 \times P_{cr}$, most preferably at least $0.95 \times P_{cr}$. For practical reasons and to avoid decomposition of the epihalohydrin polymer it is usually preferred to operate at a temperature from about 10° C. to about 200° C. most preferably from about 40° C. to about 120° C. For the same reasons it is usually preferred to operate at a pressure from about 40 bar to about 500 bar, most preferably from about 75 bar to about 400 bar. The optimal conditions may vary depending on which epihalohydrin polymer that is purified and which impurities that are most desirable to remove. For example, it has been found that DCP is efficiently removed from polyaminoamide epichlorohydrin at a preferred temperature from about 30° C. to about 180° C., most preferably from about 40° C. to about 100° C. and a preferred pressure from about 60 bar to about 500 bar, most preferably from about 75 bar to about 300 bar, while CPD is efficiently removed from polyaminoamide epichlorohydrin at a preferred temperature from about 30° C. to about 180° C., most preferably from about 50° C. to about 100° C. and a preferred pressure from about 60 bar to about 500 bar, most preferably from about 150 bar to about 400 bar The extraction may be a one stage process, but can also be performed in two or more stages with the same or different conditions, the latter being of interest if different optimal conditions for extracting different kinds of halogen containing impurities apply. The average residence time for the solution of the epihalohydrin polymer in contact with fluid under supercritical or near supercritical conditions is preferably from about 5 minutes to about 120 minutes, most preferably from about 15 minutes to about 60 minutes.

The purification through an extraction may be performed batchwise, continuously or a combination thereof.

In one embodiment the extraction is performed by maintaining a solution of the epihalohydrin polymer in vessel, preferably under agitation, and contacting it with a continuous flow of fluid under liquid, supercritical or near supercritical conditions during a time sufficient to achieve removal of halogen containing impurities to a satisfactory degree. The temperature and pressure may remain substantially constant during the entire time but may also be changed stepwise or continuously. The purified solution of the polymer can then withdrawn as a product or be transferred to a further extraction step or any other treatment.

In another embodiment the extraction is performed by contacting the solution of the epihalohydrin polymer with the fluid under liquid, supercritical or near supercritical conditions in a through-flow vessel or column, in each case with or without a packaging. Both the solution of the polymer and the fluid flow continuously through the vessel or column, preferably counter-currently, but also co-current flow could come into question. If appropriate, part of the purified polymer solution may be recirculated. The temperature and pressure may be the same or different in various parts of the vessel or column. Any kind of vessels or columns commonly used for extraction can be used, such as tray-type columns or packed columns with structured or non-structured packings made of e.g. glass, metal or ceramic materials.

The separation of extracted impurities from the withdrawn fluid is suitably done by altering the temperature and/or pressure thereof to change the solubility properties so the impurities are precipitated. Usually this is easiest done by lowering the pressure to a level below $P_{cr}$. If necessary the extracted impurities can removed from the carbon dioxide by purification with water or active carbon. After the separation the fluid can be re-used after restoring the temperature and pressure to conditions suitable for the extraction. The separated impurities may be destructed by any suitable means.

The invention will be further described in connection with the following examples, which, however, are not intended to limit the scope thereof. Unless otherwise stated, all parts and percentages refer to parts and percent by weight.

Figure 2:
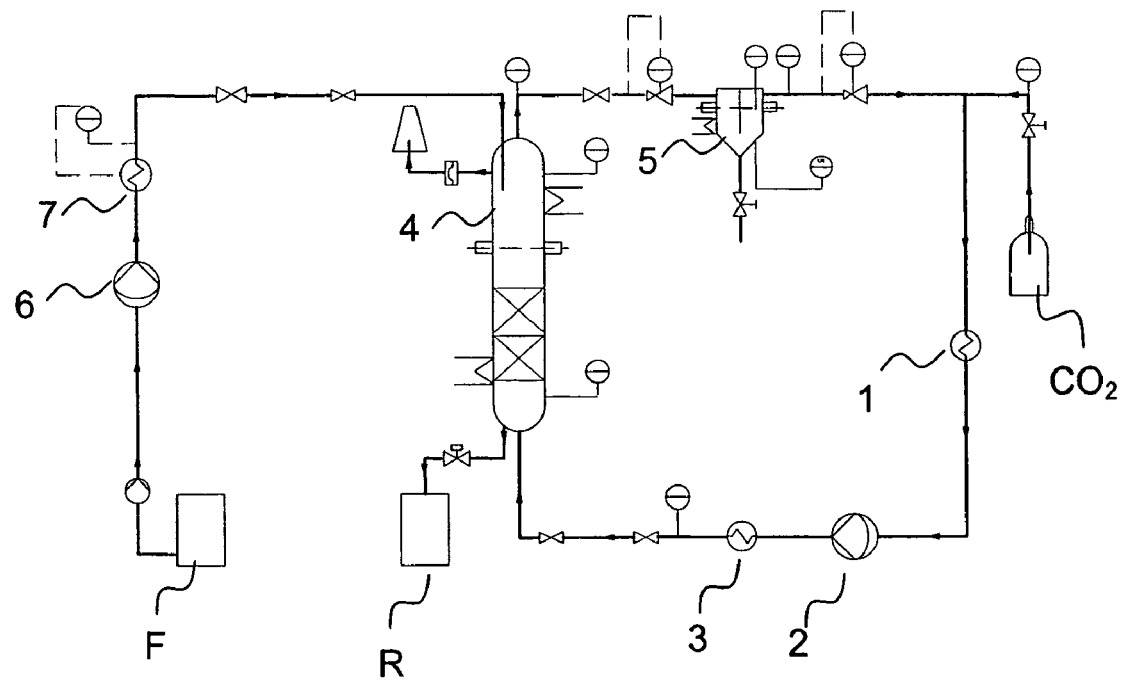

FIG. 1 is a flow sheet for batchwise extraction while FIG. 2 is a flow sheet for continuous extraction.

EXAMPLE 1

An aqueous solution of polyaminoamide epichlorohydrin polymer (PAAE) having a dry content of 20.7 wt % was purified by batch-wise extraction with supercritical carbon dioxide in an experimental setup according to FIG. 1. Before the purification the concentrations of DCP was 267 µg/g and of CPD 289 µg/g. The solution of PAAE was maintained under agitation in a 250 ml extraction vessel 4 and subjected to a continuous flow of supercritical carbon dioxide $CO_2$ brought from a vessel via a cooler 1, a pump 2 and a heat exchanger 3 under various conditions in respect of temperature, pressure and time. In a separator 5 the pressure was released, resulting in precipitation of the extracted components from the carbon dioxide. After the extraction the content of DCP and CPD in the purified PAAE solution was determined by gas chromatography. The results are shown in Table 1:

TABLE 1

Batch extraction

| Conditions Temperature, pressure, redidence time, $CO_2$ flow | µg DCP/g | µg CPD/g |
|---|---|---|
| 40° C., 150 bar, 30 min, 1.2 kg/h | 69.9 | 249.4 |
| 70° C., 150 bar, 30 min, 1.2 kg/h | 30.8 | 252 |
| 80° C., 150 bar, 30 min, 1.2 kg/h | 45.8 | 141.8 |
| 80° C., 250 bar, 60 min, 1.2 kg/h | <5 | 227 |

EXAMPLES 2-4

An aqueous solution of polyaminoamide epichlorohydrin polymer (PAAE) having a dry content of 21.2 wt % was purified by continuous extraction with supercritical carbon dioxide in an experimental setup according to FIG. 2. Before the purification the concentrations of DCP was 269.7 µg/g and of CPD 308.1 µg/g. The polymer solution F was brought via a pump 6, and a pre-heater 7 to a packed column 4 where it was contacted by a counter-current flow of carbon dioxide circulating via a cooler 1, a pump 2 a heat exchanger 3 and, after the column 4, a separator 5. The purified polymer solution was brought from the column 4 to a raffinate vessel R. In a separator 5 the pressure was released and after purification with active carbon the carbon dioxide was recycled. In Examples 2 and 3 were run as bubble extraction with the column 4 filled with polymer solution, while Example 4 was run as film extraction with the polymer solution flowing as a film on the packings in the column 4. The results are shown in Table 2.

TABLE 2

Continuous extraction

| Ex. | Conditions Temperature, pressure, Feed flow, $CO_2$ flow | µg DCP/g | µg CPD/g |
|---|---|---|---|
| 2 | 50° C., 200 bar, 1.8 kg/h Feed, 10 kg/h $CO_2$ | 16.3 | 159.7 |
| 3 | 50° C., 200 bar, 1.2 kg/h Feed, 10 kg/h $CO_2$ | 2.9 | 174.3 |
| 4 | 50° C., 200 bar, 1.2 kg/h Feed, 10 kg/h $CO_2$ | 0.8 | 202.2 |

EXAMPLE 5

The treated polymers obtained in Examples 3 and 4 as well as the commercially available polyaminoamide epichlorohydrin polymer solution Eka WS 320 were tested as wet strength agents in paper making on a pilot paper machine. The following conditions were applied:
Pulp: 40 wt % eucalyptus, 40 wt % birch, 20 wt % pine sulfate
Paper density: 70 g/m²
Freeness: about 34° SR
Consistency (chest): 1.5%
Addition levels: 6, 9 and 12 kg/tonne paper
pH (head box): 7.2-7.5
Stock temperature: 30° C.

After curing for 30 minutes at 100° C. the wet strength of the different papers made were tested and no differences could be found between the wet strength agents. Thus, it was found that the content of DCP and CPD in a polyaminoamide epichlorohydrin polymer solution could be significantly reduced without affecting its performance as wet strength agent in paper making.

The invention claimed is:

1. A process for the production of a nitrogen containing epihalohydrin polymer involving reaction of a nitrogen-containing precursor selected from the group consisting of amines, poly-amines, polyaminoamides, polyurethanes and mixtures thereof with epihalohydrin to form of a solution of said epihalohydrin polymer, the process comprising a purification step to remove organic impurities from the formed solution of the epihalohydrin polymer, said purification step comprising contacting the solution of the epihalohydrin polymer with a fluid under liquid, supercritical or near supercritical conditions to effect extraction of organic impurities from the solution of the epihalohydrin polymer to the fluid, withdrawing fluid enriched in organic impurities from the solution of the epihalohydrin polymer, and separating extracted impurities from the withdrawn fluid, wherein the fluid comprises a substance that at atmospheric pressure and room temperature (about 25° C.) is gaseous.

2. A process as claimed in claim 1, wherein the fluid is carbon dioxide.

3. A process as claimed in claim 2, wherein the epihalohydrin polymer is a polyaminoamide-epihalohydrin polymer.

4. A process as claimed in claim 2, wherein the epihalohydrin polymer is a polyaminoamide-epihalohydrin polymer.

5. A process as claimed in claim 1, wherein the organic impurities comprise organic halogen containing impurities.

6. A process as claimed in claim 5, wherein the halogen containing impurities comprise at least one of epihalohydrin and reaction products thereof.

7. A process as claimed in claim 6, wherein the reaction products of epihalohydrin comprise at least one of 1,2- and 1,3-dichloro-2-propanol and 3-chloro-1,2-propanediol.

8. A process as claimed in claim 1, wherein the solution of the epihalohydrin polymer is an aqueous solution.

9. A process as claimed in claim 1, wherein the extraction takes place at a temperature from about 10 to about 200° C.

10. A process as claimed in claim 1, wherein the extraction takes place at a pressure from about 40 to about 500 bar.

11. A process for purifying a solution of a nitrogen containing epihalohydrin polymer formed by reaction of a nitrogen-containing precursor selected from the group consisting of amines, poly-amines, polyaminoamides, polyurethanes and mixtures thereof with epihalohydrin comprising the steps of contacting the solution of the epihalohydrin polymer with a fluid under liquid, supercritical or near supercritical conditions to effect extraction of organic impurities from the solution of the epihalohydrin polymer to the fluid, withdrawing fluid enriched in organic impurities from the solution of the epihalohydrin polymer, and separating extracted impurities from the withdrawn fluid, wherein the fluid comprises a substance that at atmospheric pressure and room temperature (about 25° C.) is gaseous.

12. A process as claimed in claim 11, wherein the fluid is carbon dioxide.

13. A process as claimed in claim 11, wherein the organic impurities comprise organic halogen containing impurities.

14. A process as claimed in claim 13, wherein the halogen containing impurities comprise at least one of epihalohydrin and reaction products thereof.

15. A process as claimed in claim 14, wherein the reaction products of epihalohydrin comprise at least one of 1,2- and 1,3-dichloro-2-propanol and 3-chloro-1,2-propanediol.

16. A process as claimed in claim 11, wherein the solution of the epihalohydrin polymer is an aqueous solution.

17. A process as claimed in claim 11, wherein the extraction takes place at a temperature from about 10 to about 200° C.

18. A process as claimed in claim 11, wherein the extraction takes place at a pressure from about 40 to about 500 bar.

* * * * *

UNITED STATES PATENT AND TRADEMARK OFFICE
CERTIFICATE OF CORRECTION

Page 1 of 1

PATENT NO. : 7,576,162 B2
APPLICATION NO. : 11/471881
DATED : August 18, 2009
INVENTOR(S) : Oliver Struck et al.

It is certified that error appears in the above-identified patent and that said Letters Patent is hereby corrected as shown below:

| | |
|---|---|
| Claim 1, column 7, line 24 | "(about 25° C.) is gaseous." |
| should read | -- (about 25° C) is gaseous. -- |
| | |
| Claim 11, column 8, line 20 | "(about 25° C.) is gaseous." |
| should read | -- (about 25° C) is gaseous. -- |

Signed and Sealed this
Fifteenth Day of March, 2011

David J. Kappos
*Director of the United States Patent and Trademark Office*